United States Patent
Munro

[19]

[11] Patent Number: 6,113,744
[45] Date of Patent: Sep. 5, 2000

[54] WATER DISTILLATION APPARATUS

[76] Inventor: James Munro, 10124 - 149 Street, Edmonton, Alberta, Canada, T5P 1L1

[21] Appl. No.: 09/114,652

[22] Filed: Jul. 13, 1998

[51] Int. Cl.⁷ .............................. B01D 3/02; B01D 3/42; C02F 1/04; C02F 1/20

[52] U.S. Cl. ........................ 202/167; 202/176; 202/181; 202/185.3; 202/197; 202/202; 202/206; 203/1; 203/10; 203/22; 203/27; 203/39; 203/40

[58] Field of Search ...................................... 202/167, 176, 202/180, 235, 197, 181, 206, 185.3, 202, 193–196; 203/10, 40, DIG. 8, 22, 271, 7, 39; 95/244; 210/760, 750, 774; 96/157, 188, 189

[56] References Cited

U.S. PATENT DOCUMENTS

| | | | |
|---|---|---|---|
| 3,975,241 | 8/1976 | Smith | 202/202 |
| 3,990,951 | 11/1976 | Rajakovics | 203/11 |
| 4,045,293 | 8/1977 | Cooksley | 203/10 |
| 4,265,712 | 5/1981 | McLean | 202/166 |
| 4,339,307 | 7/1982 | Ellis, Jr. | 202/176 |
| 4,549,936 | 10/1985 | Erickson | 202/167 |
| 4,601,789 | 7/1986 | Bjorklund | 202/167 |
| 4,696,718 | 9/1987 | Lasater | 202/176 |
| 4,906,337 | 3/1990 | Palmer | 202/160 |
| 4,957,200 | 9/1990 | Turner et al. | 202/181 |
| 5,232,085 | 8/1993 | Hayashi et al. | 202/197 |
| 5,286,351 | 2/1994 | Salmon | 203/1 |
| 5,304,286 | 4/1994 | Palmer | 203/10 |
| 5,630,913 | 5/1997 | Tajer-Ardebili | 202/185.3 |

FOREIGN PATENT DOCUMENTS 1 219 545   3/1987   Canada .

*Primary Examiner*—Virginia Manoharan
*Attorney, Agent, or Firm*—Davis and Bujold

[57] ABSTRACT

A water distillation apparatus includes a degasification chamber having a top and a bottom. A liquid inlet is positioned adjacent to the bottom. A gas outlet is positioned adjacent to the top. A liquid outlet is positioned intermediate the top and the bottom. A float/valve assembly is provided for controlling the level of liquid within the chamber. A boiling chamber is provided having a top and a bottom. A liquid inlet is positioned intermediate the top and the bottom connected by a first transfer conduit to the liquid outlet of the degasification chamber. A steam outlet is positioned adjacent the top. A heating element is disposed within the boiling chamber whereby liquids within the boiling chamber are heated to the boiling point with the resulting steam passing out through the steam outlet. A condensation chamber is provided having a steam inlet and a liquid outlet. The steam inlet is connected by a second transfer conduit to the steam outlet of the boiling chamber.

9 Claims, 2 Drawing Sheets

WATER DISTILLATION APPARATUS

FIELD OF THE INVENTION

The present invention relates to a water distillation apparatus and, in particular, a water distillation apparatus intended for use in combination with a domestic hot water heating tank.

BACKGROUND OF THE INVENTION

A number of alternative approaches have been taken to water distillation that involve a domestic hot water heating tank.

A first approach is to replace the domestic hot water heating tank with a combined hot water and distilled water system. An example of this approach is U.S. Pat. No. 5,304,286 which issued to Palmer in for an invention entitled "Water Supply System" in 1994.

A second approach is to modify an existing water tank by addition of a secondary heating element and a distillation container. An example of this approach is U.S. Pat. No. 4,265,712 which issued to Peter J. McLean in 1981 for an invention entitled "Water Purification System". The McLean patent discloses a water container which is placed on top of a domestic hot water heating tank. The domestic hot water heating tank has been modified to have an additional heating element positioned in a small water chambers. Heated water is provided to the water container from the water chamber within the hot water tank, as required, with flow being controlled by a float valve. Vapour forms in the water container by reason of the high temperature of water within the water container. This vapour rises through a duct and, thereafter, condenses and is discharged into a collection receptacle.

A third approach has been to tap into the hot water tank and use preheated water from the hot water tank in an attempt to make an associated water distiller more efficient. An example of this approach is U.S. Pat. No. 4,549,936 which issued to Erickson in 1985 for an invention entitled "Combination distillation apparatus and hot liquid system". The Erickson patent discloses an evaporation chamber connected to a hot water heater by a first connecting pipe. A second connecting pipe is provided in order that hot water may continuously be cycled from the hot water heater to the evaporation chamber and then back to the hot water heater. A partial vacuum is maintained above the liquid level of the evaporation chamber so that water will boil at a lower temperature. The steam and vapour generated in the evaporation chamber moves upward along a vapour retention pipe that is connected to a condenser.

A fourth approach has been to feed preheated water from a water distillation apparatus into the hot water tank to make the hot water tank more efficient. An example of this is Canadian Patent 1,219,545 issued to Sundquist in 1987 for an invention entitled "Water Heater and Distiller Apparatus". The Sundquist patent discloses a water heater distilling apparatus that receives water directly from the domestic water system of a building and heats it. As the water is heated, steam rises passing through a network of ducting until it condenses into a container. When a demand for heated water arises, water is drawn from the distilling apparatus into a conventional hot water heater. The conventional hot water heater completes the heating of the water for domestic use.

Of the above described approaches, that of Erickson is to be preferred. The approaches of Palmer and McLean are cost prohibitive for they either require a modification of an existing hot water heating tank, or the even more costly replacement of the hot water heating tank with a combination apparatus. The teaching of Sundquist involves placing preheated water into a conventional hot water heating tank. A problem inherent in this approach is that the cycle times of the hot water tank are adversely effected. It is, therefore, preferred to use preheated water from the hot water tank to make the water distiller more efficient.

The Erickson reference also has a number of drawbacks, one of which is its manner of connection to the domestic hot water tank. The manner of connector is complex; requiring a plumber in order to avoid leakage.

SUMMARY OF THE INVENTION

What is required is an alternative water distillation apparatus that can be used with a domestic water heating tank.

According to one aspect of the present invention there is provided a water distillation apparatus that includes a degasification chamber having a top and a bottom. A liquid inlet is positioned adjacent to the bottom. A gas outlet is positioned adjacent to the top. A liquid outlet is positioned intermediate the top and the bottom. Means is provided for controlling the level of liquid within the chamber. A boiling chamber is provided having a top and a bottom. A liquid inlet is positioned intermediate the top and the bottom connected by a first transfer conduit to the liquid outlet of the degasification chamber. A steam outlet is positioned adjacent the top. A heating element is disposed within the boiling chamber whereby liquids within the boiling chamber are heated to the boiling point with the resulting steam passing out through the steam outlet. A condensation chamber is provided having a steam inlet and a liquid outlet. The steam inlet is connected by a second transfer conduit to the steam outlet of the boiling chamber.

The water distillation apparatus, as described above, is especially adapted to receive preheated water directly from a domestic hot water heating tank. The water distillation is a three step process. Volatile gases are removed in the degasification chamber. The water is turned into steam in the boiling chamber. The steam is then condensed in the condensation chamber.

Although beneficial effects may be obtained through the use of the water distillation apparatus, as described above, there are a number of independent features that can be added to improve the operation of the degasification chamber. Even more beneficial results may be obtained when a magnet is disposed within the degasification chamber thereby retarding scale build up in the degasification chamber. There are various means that can be used for controlling the level of liquid within the degasification chamber. The preferred means involves the use of a solenoid valve at the liquid inlet and a float coupled to a valve actuator. With this configuration the valve actuator opens and closes the solenoid valve to control the entry of water into the degasification chamber in response to movement of the float.

Although beneficial effects may be obtained through the use of the water distillation apparatus, as described above, there are a number of independent features that can be added to improve the operation of the condensation chamber. Even more beneficial results may be obtained when the condensation chamber has a plurality of exterior heat transfer fins. This feature improves the ability of the condensation chamber to condense the steam. Even more beneficial results may be obtained when the condensation chamber has a removable scale retention mesh and an opening through which the scale retention mesh is removed. The deposit of scale and condensate is unavoidable. It is, therefore, advisable to provide a medium upon which the scale will tend to build that is removable for cleaning or replacement. It is preferred that a removable scale retention mesh be provided in the boiling chamber, as well.

Although beneficial results may be obtained through the use of the water distillation apparatus, as described above, the steam that condenses in the condensation chamber exits the liquid outlet as distilled water. Even more beneficial results may, therefore, be obtained when a third transfer conduit connects the liquid outlet of the condensation chamber with an inlet of a distilled liquid holding tank. The purity of the distilled water can be adversely effected as it is sitting awaiting use. It is, therefore, preferred that the distilled liquid holding tank have an ozonator. The distilled liquid holding tank has only a limited capacity. It is, therefore, preferred that the distilled liquid holding tank have a float activated switch coupled to the heating element in the boiling chamber. This serves as means for controlling the level of liquid within the distiller. When the heating element cools, water is no longer evaporated out of the boiling chamber. This effectively shuts down the system. The shut down of the system is triggered whenever the level of distilled liquid in the distilled liquid holding tank rises to a maximum level as indicated by the float activated switch.

According to another aspect of the present invention there is provided, in combination, a domestic hot water heating tank and a water distillation apparatus as described above. The domestic hot water heating tank has a liquid receptacle having a top surface with an inlet and an outlet. A cold water inlet pipe is secured to the inlet. A hot water outlet pipe is secured to the outlet. Means is provided for heating liquid within the liquid receptacle. In accordance with the teaching of the present invention the degasification chamber sits on the top surface of the liquid receptacle of the domestic hot water heating tank. A liquid conduit extends between the liquid inlet of the degasification chamber and the hot water outlet pipe of the domestic hot water heating tank whereby preheated water is conveyed from the hot water outlet pipe of the domestic hot water heater to the liquid inlet of the degasification chamber. The boiling chamber also sits on the top surface of the liquid receptacle of the domestic hot water heating tank. The condensation chamber is annular. The annular condensation chamber sits on the top surface of the liquid receptacle of the domestic hot water heating tank encircling the cold water inlet pipe such that a heat exchange takes place between the cold water inlet pipe and the condensation chamber.

It is to be noted the comparison between the size and configuration of Erickson and the combinations as described above. The water distillation apparatus disclosed in the Erickson patent is large and bulky; taking up considerable space. In contrast, the water distillation apparatus is capable of being positioned on the top surface of the domestic hot water heating tank.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 1:
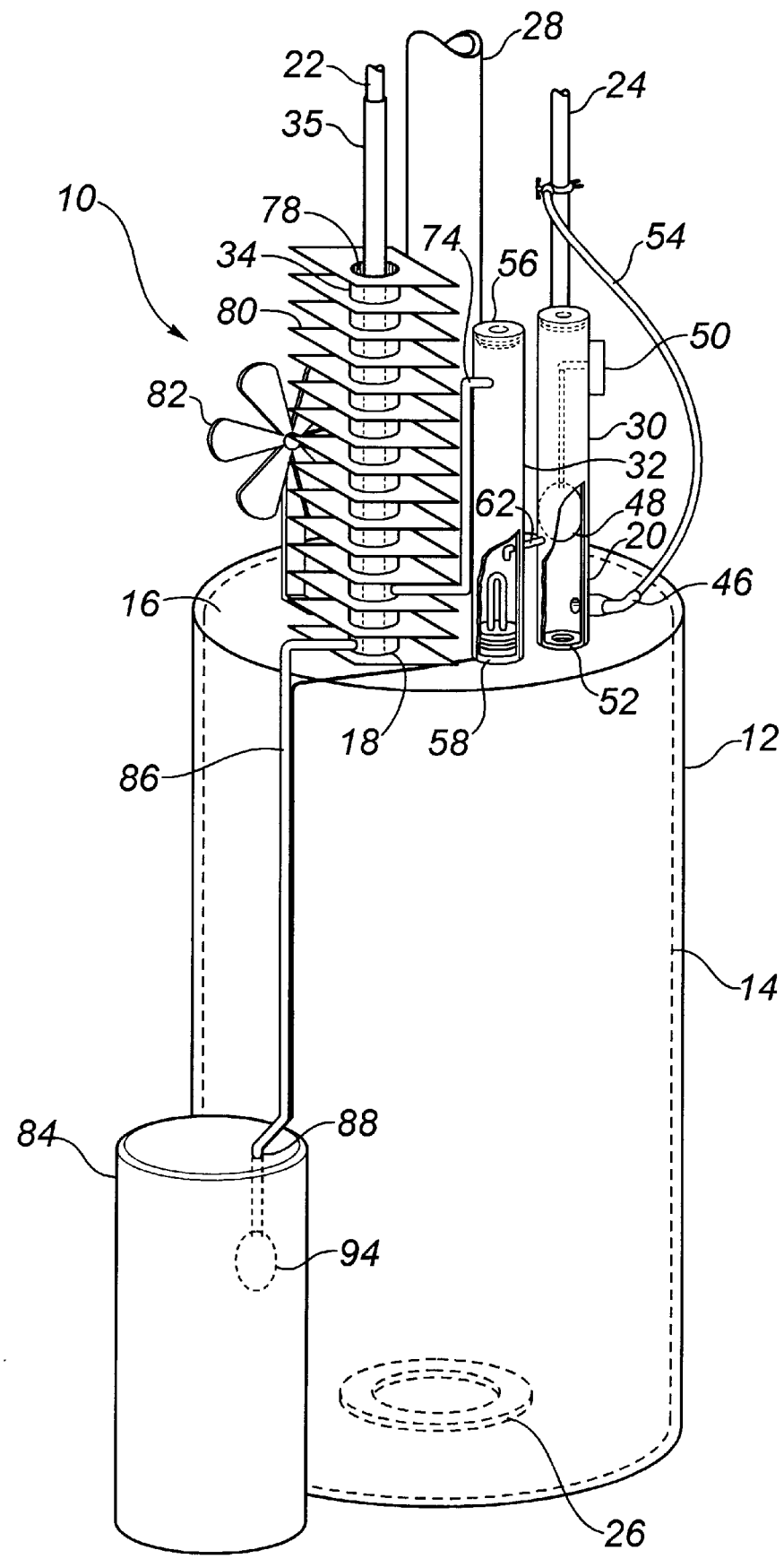
FIG. 1 is a perspective view of a water distillation apparatus constructed in accordance with the teaching of the present invention in combination with a domestic hot water heating tank.

The preferred embodiment, a water distillation apparatus generally identified by reference numeral 10, will now be described with reference to FIGS. 1 and 2.

Figure 2:
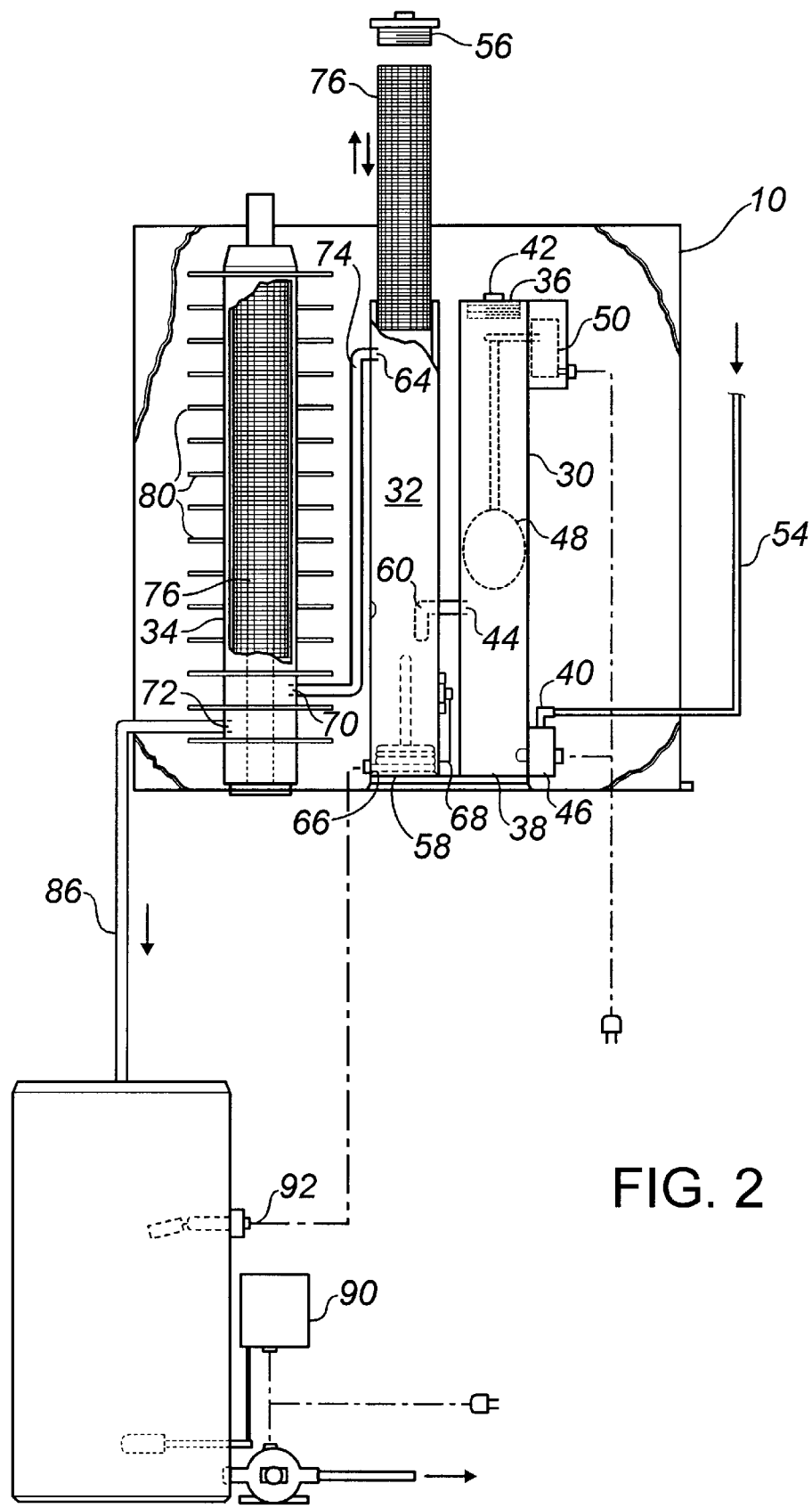
FIG. 2 is a partially exploded side elevation view, in section, of the water distillation apparatus illustrated in FIG. 1.

Water distillation apparatus 10 is illustrated in FIG. 1 in combination with a domestic hot water heating tank, generally identified by reference numeral 12. Hot water heating tank 12 includes an enclosed cylindrical liquid receptacle 14 having a top surface 16 with an inlet 18 and an outlet 20. A cold water inlet pipe 22 is secured to inlet 18. A hot water outlet pipe 24 is secured to outlet 20. A heating element 26 is provided for heating liquid within liquid receptacle 14. Hot water heating tank 12, as illustrated, is fuelled by natural gas and, as such, has a vent pipe 28.

The main components of water distillation apparatus 10 are an elongate cylindrical degasification chamber 30, an elongate cylindrical boiling chamber 32 and an elongate annular condensation chamber 34. In the configuration illustrated, each of chambers 30, 32, and 34 is contained in a housing which is positioned on top surface 16 of liquid receptacle 14 of domestic hot water heating tank 12. Referring to FIG. 2, degasification chamber 30 has a top 36 and a bottom 38. A liquid inlet 40 is positioned adjacent to bottom 38. A gas outlet 42 is positioned adjacent to top 36. A liquid outlet 44 is positioned intermediate top 36 and bottom 38. The means provided for controlling the level of liquid within degasification chamber 30 includes a solenoid valve 46 at liquid inlet 40 and a float 48 coupled to a valve actuator 50. Valve actuator 50 opens and closes solenoid valve 46 to control the flow of water through liquid inlet 40 into degasification chamber 30 in response to movement of float 48. A sealed ceramic magnet 52 is disposed within degasification cheer 30 to retard scale build up within degasification chamber 30 and associated valve 46 and valve actuator 50. Referring to FIG. 1, a liquid conduit 54 extends between liquid inlet 40 of degasification chamber 30 and hot water outlet pipe 24 of domestic hot water heating tank 12. Preheated water is conveyed by liquid conduit 54 from hot water outlet pipe 24 of domestic hot water heating tank 12 to liquid inlet 40 of degasification chamber 30. Referring to FIG. 2, boiling chamber 32 has a top 56 and a bottom 58, A liquid inlet 60 is positioned intermediate top 56 and bottom 58. Liquid inlet 60 is connected by a first transfer conduit 62 to liquid outlet 44 of degasification chamber 30. A steam outlet 64 is positioned adjacent to top 56. A heating element 66 is disposed within boiling chamber 32. Liquids within boiling chamber 32 are heated by heating element 66 to the boiling point with the resulting steam passing out through steam outlet 64. A thermostat 68 is provided to monitor the temperature within boiling chamber 32. Boiling chamber 32 is provided with a removable stainless steel scale retention mesh 76. Scale retention mesh 76 greatly increases the amount of internal surface area for deposit of participated solids. As water boils in boiling chamber 32, a portion of the heat backs up into gasification chamber 30 via first transfer conduit 62 and liquid outlet 44. This raises the temperature in gasification chamber 30, thereby assisting in the removal of volatile gases. Condensation chamber 34 has a steam inlet 70 and a liquid outlet 72. Steam inlet 70 is connected by a second transfer conduit 74 to steam outlet 64 of boiling chamber 32. Referring to FIG. 1, it can be seen that annular condensation chamber 34 encircles cold water inlet pipe 22. Annular condensation chamber 34 has an internal sleeve-like stainless steel wall 35 that is positioned immediately adjacent to cold water inlet pipe 22. A heat exchange takes place between cold water inlet pipe 22 and condensation chamber 34. Condensation chamber 34 as a removable scale retention mesh 76 and an opening 78 through which scale retention mesh 76 is removed for cleaning or replacement. Scale retention mesh 76 serves to retain scale and condensate. Condensation chamber 34 also has a plurality of exterior heat transfer fins 80. Referring to FIG. 1, a fan 82 is positioned on top surface 16 of liquid receptacle 14 of domestic hot water heating tank 12. Fan 82 directs a flow of cooling air past exterior heat transfer fins 80. Although scale retention mesh 76 provides a surface for retention of dissolved solids, the main purpose is to provide an increased surface area for the transfer of heat to exterior heat transfer fins 80 and to internal wall 35. A distilled liquid holding tank 84 is provided. A third transfer conduit 86 connects liquid outlet 72 of condensation chamber 34 with an inlet 88 of distilled liquid holding tank 84. Distilled liquid holding tank has an ozonator 90, that, at timed intervals, disinfects the distilled liquid which accumulates within distilled liquid holding tank 84. Distilled liquid holding tank 84 has a float activated switch 92 that is activated by float 94. Switch 92 is coupled to heating element 66. Switch 92 turns heating element 66 on and off. The water level in boiling chamber 32 and gasification chamber 30 is always in equilibrium. When heating element 66 is turned on, water evaporates from boiling chamber 32 and is replaced by water from gasification chamber 30. When heating element 66 is turned off, water gradually stops evaporating until the system shuts down.

The use and operation of water distillation apparatus 10 will now be described with reference to FIGS. 1 and 2. Referring to FIG. 1, degasification chamber 30, boiling chamber 32 and condensation chamber 34 are placed on top surface 16 of closed cylindrical liquid receptacle 14 of domestic water heating tank 12. Internal wall 35 of annular condensation chamber 34 is slid over cold water inlet pipe 22 so it encircles cold water inlet pipe 22. Liquid conduit 54 is connected so it extends between liquid inlet 40 of degasification chamber 30 and hot water outlet pipe 24 of domestic hot water heating tank 12. Preheated water is conveyed by liquid conduit 54 from hot water outlet pipe 24 of domestic hot water heating tank 12 to liquid inlet 40 of degasification chamber 30. As the preheated water fills degasification chamber 30, float 48 rises. The level of float 48 is adjustable and may be preset at a desired level. When float 48 reaches the preset level, valve actuator 50 closes solenoid valve 46 to stop the flow of preheated water through liquid inlet 40 into degasification chamber 30. Thereafter, valve actuator opens and closes solenoid valve 46 in response to movement of float 48. Any volatile gases in the preheated liquid escape through gas outlet 42 at top 36. The liquid passes through liquid outlet 44 via first transfer conduit 62 to liquid inlet 60 of boiling chamber 32. In addition, heat backs up via first transfer conduit 62 from boiling chamber 32 to degasification chamber 30. This additional heat promotes degasification. Liquids within boiling chamber 32 are heated by heating element 66 to the boiling point with the resulting steam passing out through steam outlet 64. Steam passing through steam outlet 64 is transferred via second transfer conduit 74 to steam inlet 70 of condensation chamber 34. However, minerals and heavy metals are largely trapped within boiling chamber 32; adhering to scale retention mesh 76. Once within condensation cheer 34, the steam rapidly loses its heat and is condensed to form distilled water. Heat is conveyed by scale retention mesh 76 to internal wall 35 and to exterior heat transfer fins 80. A heat exchange then takes place between internal wall 35 and cold water inlet pipe 22, which internal wall 35 encircles. Heat is also transferred to atmosphere by the continuous flow of cooling air which fan 82 directs past exterior heat transfer fins 80. As the steam condenses the resulting distilled water flows by force of gravity along third transfer conduit 86 to distilled liquid holding tank 84. Distilled liquid holding tank 84 has an ozonator 90 running on a teed basis to disinfect the distilled liquid which accumulates. When the level of distilled liquid in distilled liquid holding tank 84 rises to a maximum level as indicated by float 94, switch 92 is activated. Switch 92 shuts down the distillation process by turning heating element 66 off. As part of routine maintenance both scale retention mesh 76 are periodically removed for cleaning or replacement.

With apparatus 10, as described above, volatile gases are removed in gasification chamber 30. It is important to note that float 48 is positioned in degasification chamber 30, where it is sheltered from boiling liquid. Were float 48 positioned in boiling chamber 32, it would have a tendency to bounce making its operation unreliable. Both boiling chamber 32 and condensation chamber 34 remove dissolved solids with a large surface area for solids retention provided by scale and mesh 76. Preheated water is drawn from the hot water tank to reduce the cost of heating water for distillation. Cold water entering the hot water tank is, in turn, preheated. A heat transfer takes place between hot fluids in annular condensation chamber 34 and cold water passing along cold water inlet pipe 22. The preheating of the water and the subsequent heat transfer allows water distillation apparatus 10 to operate using a fraction of the energy a normal distillation device would require.

The system illustrated is relatively compact when compared with the prior art. The housing in which apparatus 10 is contained is 12 inches×6 inches×18 inches. It would normally be equipped with an overflow passage (not shown), as a safety precaution in the event of a water backup. The chamber are 1½ to 2 inches in diameter. There are, of course, different makes and models of water heating tank 12. The system allows the flexibility to be hooked up in a variety of configurations. Boiling chamber condensation chamber, and degasification chamber need not be side by side within the same housing, as illustrated; nor do all chambers need not be positioned on top surface 16 of hot water tank 12.

It will be apparent to one skilled in the art that modifications may be made to the illustrated embodiment without departing from the spirit and scope of the invention as hereinafter defined in the Claims.

What is claimed is:

1. In combination:
    a. domestic hot water heating tank including:
        a liquid receptacle having a top surface with an inlet and an outlet;
        a cold water inlet pipe secured to the inlet;
        a hot water outlet pipe secured to the outlet; and
        means for heating liquid within the liquid receptacle;
    b. a water distillation apparatus, comprising:
        an elongate degasification chamber having a top and a bottom, a liquid inlet adjacent to the bottom, a gas outlet adjacent to the top, a liquid outlet intermediate the top and the bottom, and means for controlling a level of liquid within the chamber;
        a liquid conduit extending between the liquid inlet of the degasification chamber and the hot water outlet pipe of the domestic hot water heating tank whereby preheated water is conveyed from the hot water outlet pipe of the domestic hot water heating tank to the liquid inlet of the degasification chamber;

an elongate boiling chamber having a top and a bottom, a transfer conduit connecting a liquid inlet intermediate the top and the bottom with the liquid outlet of the degasification chamber, a steam outlet adjacent the top, a heating element being disposed within the boiling chamber whereby liquids within the boiling chamber are heated to a boiling point with resulting steam passing out through the steam outlet, the boiling chamber having a removable scale retention mesh and an opening through which the scale retention mesh is removed, a level of water within the boiling chamber being governed solely by equalization with a level of water within the degasification chamber, heat passing from the boiling chamber through the transfer conduit back to the degasification chamber, thereby increasing a temperature of fluids in the degasification chamber; and an annular condensation chamber having a steam inlet and a liquid outlet, the steam inlet being connected to the steam outlet of the boiling chamber, the annular condensation chamber sitting on the top surface of the liquid receptacle of the domestic hot water heating tank encircling the cold water inlet pipe such that a heat exchange takes place between the cold water inlet pipe and the condensation chamber.

2. The water distillation apparatus as defined in claim 1, wherein the condensation chamber has a plurality of exterior heat transfer fins.

3. The water distillation apparatus as defined in claim 1, wherein the condensation chamber has a removable scale retention mesh and an opening through which the scale retention mesh is removed.

4. The water distillation apparatus as defined in claim 1, wherein a magnet is disposed within the degasification chamber thereby retarding scale build up in the degasification chamber.

5. The water distillation apparatus as defined in claim 1, wherein the means for controlling the level of liquid within the degasification chamber includes a solenoid valve at the liquid inlet and a float coupled to a valve actuator, such that the valve actuator opens and closes the solenoid valve to control the entry of the liquid into the degasification chamber in response to movement of the float.

6. The water distillation apparatus as defined in claim 1, wherein a another transfer conduit connects the liquid outlet of the condensation chamber with an inlet of a distilled liquid holding tank.

7. The water distillation apparatus as defined in claim 6, wherein the distilled liquid holding tank has an ozonator.

8. The water distillation apparatus as defined in claim 6, wherein the distilled liquid holding tank has a float activated switch coupled to the heating element in the boiling chamber, such that the heating element is turned off to stop the distillation process whenever the level of distilled liquid in the distilled liquid holding tank rises to a holding capacity level as indicated by the float activated switch.

9. In combination:
a. a domestic hot water heating tank including;
   a liquid receptacle having a top surface with an inlet and an outlet;
   a cold water inlet pipe secured to the inlet;
   a hot water outlet pipe secured to the outlet; and
   a heating element for heating liquid within the liquid receptacle;
b. a water distillation apparatus, comprising:
   an elongate degasification chamber having a top and a bottom, a liquid inlet adjacent to the bottom, a gas outlet adjacent to the top, a liquid outlet intermediate the top and the bottom, and means for controlling the level of liquid within the chamber including a solenoid valve at the liquid inlet and a float coupled to a valve actuator, such that the valve actuator opens and closes the solenoid valve to control the entry of water into the degasification chamber in response to movement of the float, a ceramic magnet being disposed within the degasification chamber thereby retarding scale build up, the degasification chamber sitting on the top surface of the liquid receptacle of the domestic hot water heating tank;
   a liquid conduit extending between liquid inlet of the degasification chamber and the hot water outlet pipe of the domestic hot water heating tank whereby preheated water is conveyed from the hot water outlet pipe of a domestic hot water heater to the liquid inlet of the degasification chamber;
   an elongate boiling chamber having a top and a bottom, a liquid inlet intermediate the top and the bottom connected by a first transfer conduit to the liquid outlet of the degasification chamber, a steam outlet adjacent the top, a heating element being disposed within the boiling chamber whereby liquids within the boiling chamber are heated to the boiling point with the resulting steam passing out through the steam outlet, the boiling chamber sitting on the top surface of the liquid receptacle of the domestic hot water heating tank;
   an annular condensation chamber having a steam inlet and a liquid outlet, the steam inlet being connected by a second transfer conduit to the steam outlet of the boiling chamber, the annular condensation chamber sitting on the top surface of the liquid receptacle of the domestic hot water heating tank encircling the cold water inlet pipe such that a heat exchange takes place between the cold water inlet pipe and the condensation chamber, the condensation chamber having a removable scale retention mesh and an opening through which the scale retention mesh is removed the condensation chamber having a plurality of exterior heat transfer fins;
   a fan positioned on the top surface of the liquid receptacle of the domestic hot water heating tanks, the fan directing a flow of cooling air past the exterior heat transfer fins of the condensation chamber;
   a distilled liquid holding tank, a third transfer conduit connecting the liquid outlet of the condensation chamber with an inlet of the distilled liquid holding tank, the distilled liquid holding tank having an ozonator, the distilled liquid holding tank having a float activated switch coupled to the heating element in the boiling chamber, such that the heating element is turned off to stop the distillation process whenever the level of distilled liquid in the distilled liquid holding tank rises to a maximum level as indicated by the float activated switch.

* * * * *